United States Patent [19]
Menke et al.

[11] 3,905,567
[45] Sept. 16, 1975

[54] MOORING SYSTEM ARRANGEMENT FOR BLIMP-SHAPED TETHERED BALLOONS

[75] Inventors: James A. Menke, Shakopee; Eugene L. Haak, Northfield, both of Minn.

[73] Assignee: G. T. Schjeldahl Company, Northfield, Minn.

[22] Filed: Mar. 13, 1974

[21] Appl. No.: 450,603

[52] U.S. Cl. ............................................. 244/115
[51] Int. Cl.² ........................................... B64F 1/14
[58] Field of Search ........................... 244/115, 116

[56] References Cited
UNITED STATES PATENTS

| | | | |
|---|---|---|---|
| 1,749,065 | 3/1930 | Burney | 244/116 |
| 1,799,677 | 4/1931 | Clergue | 244/116 |
| 1,823,063 | 9/1931 | Powelson | 244/116 |
| 1,834,220 | 12/1931 | Purnell | 244/116 |
| 1,861,983 | 6/1932 | Short | 244/115 |
| 1,865,790 | 7/1932 | Rosendahl | 244/115 |
| 1,918,523 | 7/1933 | Dyer et al. | 244/116 |

FOREIGN PATENTS OR APPLICATIONS

| | | | |
|---|---|---|---|
| 579,586 | 10/1924 | France | 244/116 |
| 166,206 | 7/1921 | United Kingdom | 244/115 |

*Primary Examiner*—Trygve M. Blix
*Assistant Examiner*—Galen L. Barefoot
*Attorney, Agent, or Firm*—Orrin M. Haugen

[57] ABSTRACT

A mooring system for aerodynamic-shaped tethered balloons such as blimps and the like which includes a mooring mast which may be an articulating mast disposed centrally of an endless circular rail carrying a flying sheave along with a pair of laterally and outwardly disposed handling line winches. The flying sheave is operatively associated or coupled to the tether line with one end of the tether line being secured to the balloon, and with the other end of the tether line being secured to a tether line winch and coupled to a circular trolley movable about an arcuate path around the endless circular rail. In addition, a pair of handling lines are arranged to be anchored to the circular trolley so as to secure the aerodynamic structure in moored disposition.

4 Claims, 7 Drawing Figures

PATENTED SEP 16 1975 3,905,567

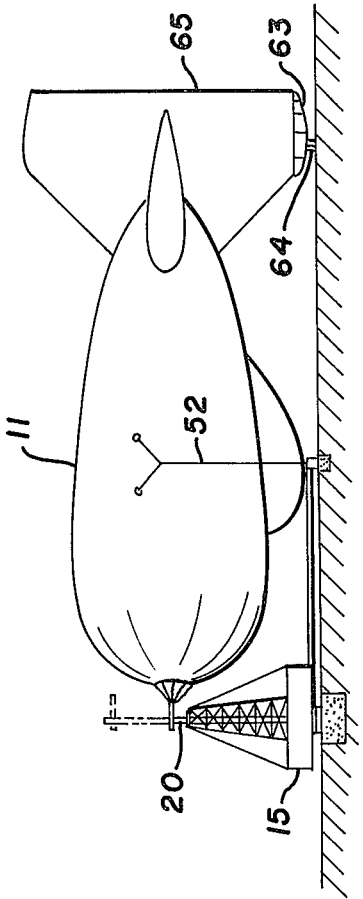
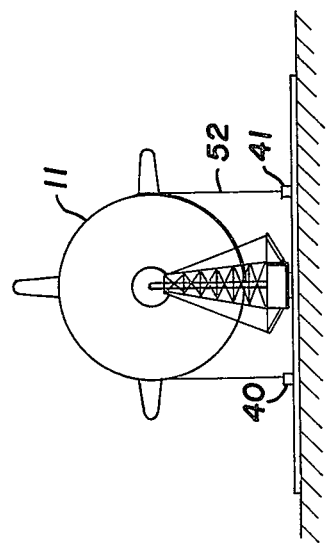
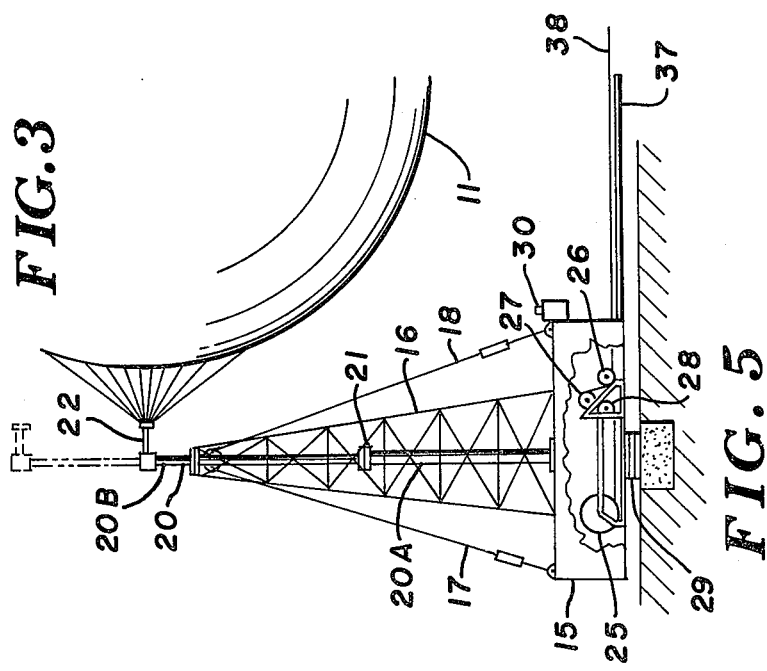
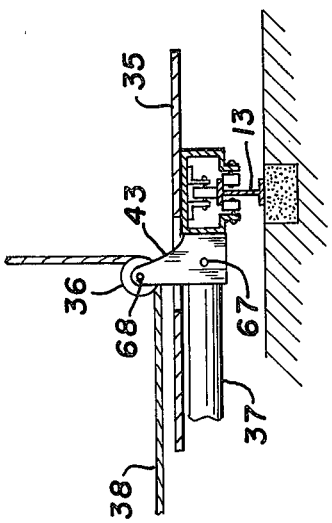
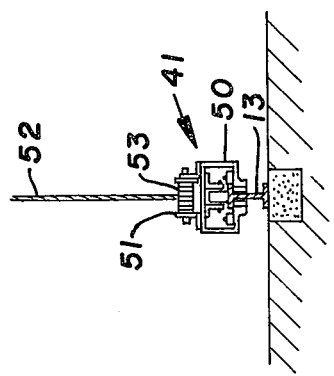

MOORING SYSTEM ARRANGEMENT FOR BLIMP-SHAPED TETHERED BALLOONS

BACKGROUND OF THE INVENTION

The present invention relates generally to a mooring system for aerodynamically-shaped tethered balloon structures, and more specifically to such a mooring system which includes a vertically disposed articulating mast arranged centrally of an endless circular rail, the circular rail supporting a trolley mechanism which carries a flying sheave along with a pair of laterally disposed anchoring means for securing handling lines, as well as a balloon and load servicing platform. The mooring system of the present invention makes it possible to moor a balloon structure in proper disposition relative to surface winds, thereby enabling the operating crew to moor and service the structure under any normal wind conditions.

In accordance with the present invention, a mast which is preferably capable of articulating motion, is provided, preferably carrying a balloon nose latch, with the mast being mounted or otherwise secured to a rotating turntable located at the center of an endless circular rail structure. Three individual trolley elements are arranged to move arcuately on the circular rail, these trolleys including a flying main tether line sheave trolley along with two laterally disposed close-haul winch trolleys for securing the structure when at a disposition close to the mooring mast. The flying sheave trolley is, of course, free to travel about the rail to any arcuate disposition at any time. The main tether line winch is arranged to pivot at the center of the circular rail so that it is retained in proper alignment with the flying sheave. Therefore, precise, accurate, and trouble-free operation is achieved with a minimum of components being required for the overall operations.

In the past, various techniques and arrangements have been proposed for mooring systems, including the use of a centrally disposed mast and radially outwardly disposed endless circular rails. While these systems have met with limited success, the present arrangement makes it possible to achieve substantially trouble-free operation under a variety of adverse or changing situations. For example, winds aloft frequently shift direction relative to surface winds, as well as corresponding shifts in velocity and the like. In addition, the boom member which extends between the central winch and the flying sheave is arranged to respond to compression loading which occurs between these members with the balloon in launched tethered disposition. Therefore, the present mooring system makes it possible to achieve appropriate alignment of the flying sheave trolley as well as the main tether line winch at all times, thereby rendering it possible to achieve a more trouble-free operation in the system.

SUMMARY OF THE INVENTION

Therefore, it is a primary object of the present invention to provide an improved mooring system for aerodynamically-shaped tethered balloon structures which includes a centrally disposed mast means along with a radially outwardly disposed endless circular rail, the rail carrying a flying sheave trolley which moves arcuately about the circular rail, with a main tether line winch being pivotally disposed at the center of the circular rail so as to maintain the winch in proper alignment with the flying sheave, with a boom member extending between the winch and the flying sheave reacting to compressive loading established between the flying sheave and the main winch with the balloon in launched tethered disposition.

It is yet a further object of the present invention to provide an improved mooring system or arrangement for aerodynamically-shaped tethered balloon structures wherein a centrally disposed mooring mast is provided along with a radially outwardly disposed endless circular rail, and with means being provided for arcuate or circular movement of a flying sheave trolley disposed on the endless circular rail, and with means being provided to maintain alignment between the flying sheave and the main tether line winch.

It is yet a further object of the present invention to provide an improved mooring means for aerodynamically-shaped tethered balloon structures which includes a centrally disposed mooring mast along with a radially disposed endless circular rail, a radially extending boom coupling the mooring mast to a flying sheave, the endless circular rail carrying a trolley system which supports the central flying sheave along with laterally disposed handling line winches.

Other and further objects of the present invention will become apparent to those skilled in the art upon a study of the following specification, appended claims, and accompanying drawings.

BRIEF DESCRIPTION OF THE DRAWINGS

FIG. 3 is a front elevational view of the system and illustrating a blimp in tethered disposition thereon;

FIG. 4 is a side elevational view of the system illustrated in FIG. 3; and

FIGS. 5, 6 and 7 are partial side elevational views of the mooring mast arrangement, a close-haul winch trolley shown on the circular rail, and the flying sheave trolley mounted on the central supporting platform, respectively.

DESCRIPTION OF THE PREFERRED EMBODIMENT

Figure 1:
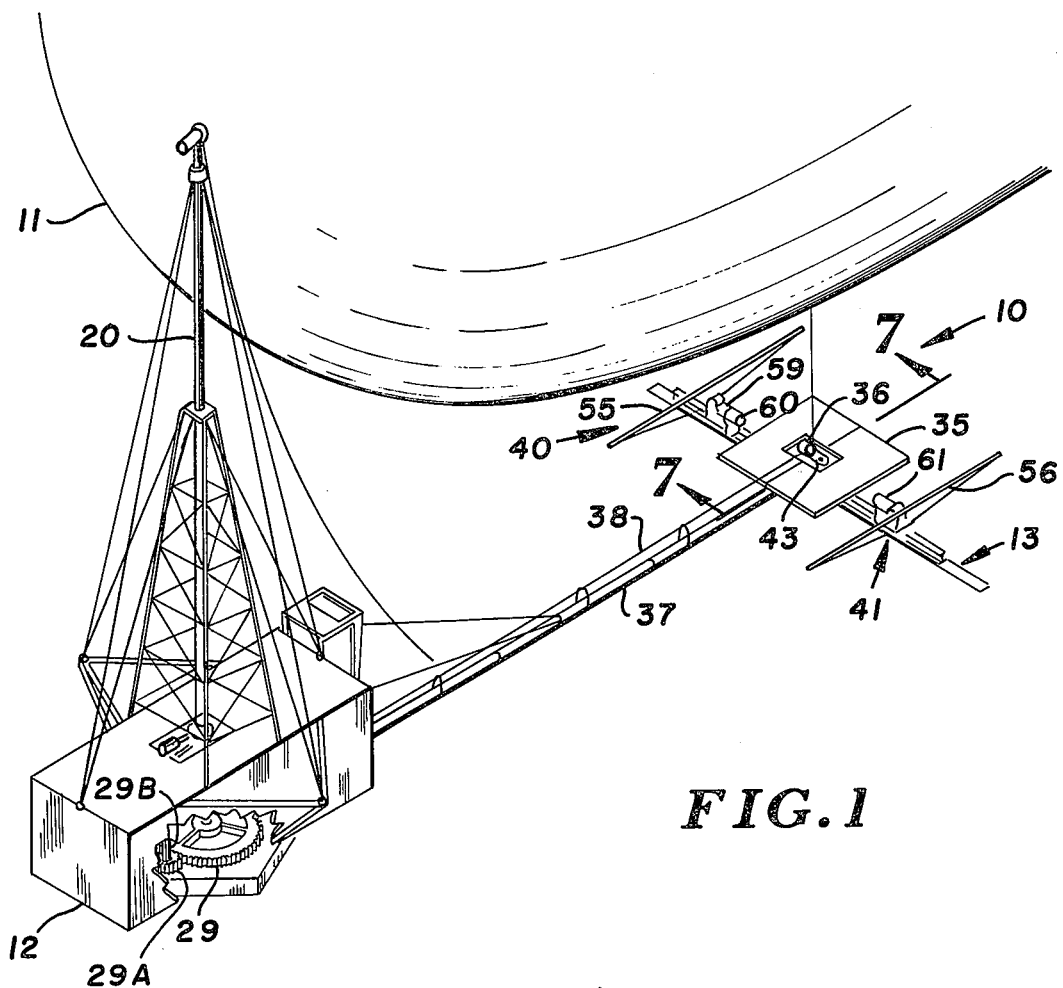
FIG. 1 is an isometric view of the improved mooring system arrangement of the present invention and illustrating a portion only of a blimp-shaped tethered balloon arranged in moored disposition thereon.
Figure 2:
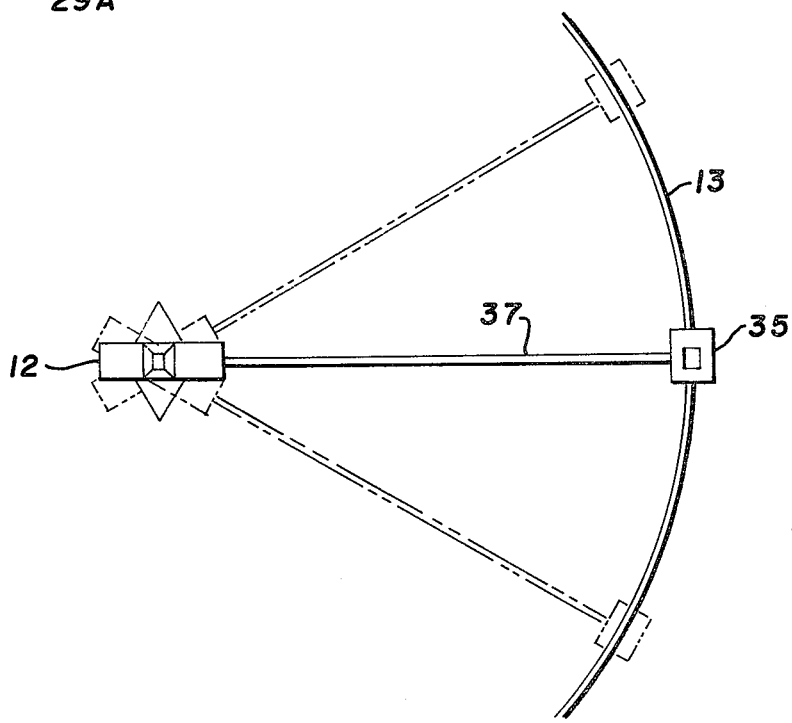
FIG. 2 is a partial top plan view of the system with the balloon removed, and showing the centrally disposed telescoping mast with the boom arrangement being shown in solid lines in one disposition, and in phantom in alternate dispositions, and with a segment only of the endless circular rail being shown.

In accordance with the preferred embodiment of the present invention, and with particular attention being directed to FIG. 1 of the drawings, the balloon mooring system generally designated 10, which is provided for mooring the blimp-shaped tethered balloon structure 11, includes a centrally disposed base mounting structure 12, along with an outwardly or radially disposed endless circular rail structure shown generally at 13. In this system, therefore, balloon 11 is arranged to be releasably moored in the mooring system 10, with means being provided for ease of handling under a variety of launch and mooring conditions.

Turning now to the centrally disposed portion 12, attention is further directed to FIG. 5 for an understanding of this arrangement. The structure includes a central housing 15 which has a platform surface supporting mast stabilizer tower 16 supported by guy lines 17 and 18 (when required), with the mast 20 being disposed therewithin. It will be appreciated that guy lines are not always required and that the mast construction will determine the need for such lines. The mast 20 may be made up of telescoping segments, and telescopically arranged coupling members are shown at 21 in order to move the segments between retracted disposition, shown in full lines, and extended disposition shown in phantom in FIG. 5. Nose latch assembly is shown at 22, with this assembly being conventional and arranged to releasably secure or couple the nose of structure 11 thereto. While mast 20 is shown as comprising telescopically engaging segments, it will be appreciated that a fixed height mast may also be employed, when desired.

Within the confines of housing 15, a winch assembly is provided as in FIG. 5, with the assembly including a main drum 25 along with appropriately arranged idler and drive pulleys 26, 27 and 28. Means are provided at 29 such as a thrust bearing and drive gear arrangement 29A and motor 29B with suitable clutching to permit controllable arcuate rotation of housing 15, tower 16, mast 20, along with the guy lines so as to controllably rotate the drum 25 along with idler and drive pulleys 26, 27 and 28 so that the main tether line winch may be retained in proper alignment with the flying sheave at all times.

The mooring mast is mounted upon the turntable and is rotatable about its central axis. Thus, mast system 20, in addition to being telescopically arranged, is also rotatable about its axis so as to achieve any desired radial position for the nose latch assembly shown at 22.

Preferably, the main winch drum 25 is utilized with a hydraulically driven capstan so as to provide appropriate control of the system. Also, a cable tension warning system should be provided for added safety in the system, with such a means being illustrated as at 30.

In order to achieve an alternate arrangement for the telescoping mooring mast, the support member 16 along with its guy lines 17 and 18 may be eliminated, with the lower portion 20A of the mast being further replaced by a lattice structure. In this situation, the upper portion of the telescoping mast, such as that portion identified at 20B is arranged to slide up and down inwardly of the lattice structure. In such an arrangement, a suitable vertically adjustable mooring mast is provided which, in effect, is telescopically engaged with a base support structure.

Attention is now directed to the details of the trolley sheave system arranged to be supported on the endless circular rail 13. In this portion of the arrangement, a rotatable boom coupling support platform, also functioning as a sheave housing means is provided at 35, with this platform supporting a flying sheave member 36 thereon. Boom 37 is utilized to couple platform 35 to the main tether line winch system as illustrated at 25-29 inclusive. Boom member 37 reacts or responds to compressive loading which is established between flying sheave 36 and main winch, such as main winch drum 25. This reaction or response is desirable in the operation and flying of tethered balloons, since side thrust or horizontal forces are not transmitted to the rail. Boom 37 therefore provides a means for guiding cable 38 which is, as indicated, utilized between drum 25 and the main line system. In particular, the platform 35 may be utilized as a work supporting surface for servicing the balloon mounted payload, as well as servicing of structure 11. Surface 35 also serves as an anchoring means for the flying sheave 36. Laterally of means 35 are a pair of close-haul winch assemblies as shown generally at 40 and 41, with these assemblies being essentially identical, one to another, and utilized for close-haul balloon servicing, and also to serve to stabilize the balloon over platform 35. These devices are, as indicated, arranged laterally outwardly of the flying sheave housing means 35, and generally in vertical alignment with the close-haul lines on the outer diameter of the blimp structure.

Turning now to the details of the flying sheave arrangement, and with continued attention being directed to FIG. 1, the flying sheave 36 is supported on a trolley or truck system 43 which is, in turn, supported on endless circular rail 13. Rail 13 is preferably in the form of an "I" beam and is, of course, appropriately anchored to the soil. The flying sheave acts as a guide for the main tether line which is, in turn, secured to the blimp structure as is appropriate.

Attention is now directed to FIG. 6, with continuing attention being directed to FIG. 1, wherein the close-haul winches are illustrated. Close-haul winch 41 includes a truck unit 50 supported on rail 13, with truck unit 50 supporting a close-haul winch 51. Close-haul line 52 is shown on the winch system, as being wound upon drum 53. Tie-down trusses may be provided at 55 and 56, if reasonably required. Alternatively, the tie-down trusses 55 and 56 may be deleted, and alternate means such as eye-bolts secured to the edges of platform 35 may be provided. It will be appreciated that the lateral dimensions of platform 35, as compared to the size of the structure 11 will determine whether or not tie-down trusses should be utilized separately of the platform or integral therewith.

As is conventional in tie-down systems, a friction brake may be provided in the winch system as at 59 to anchor the flying sheave trolley and close-haul trolley to the circular rail. Energy is preferably supplied to the system by means of drum rotating electric motors 60 and 61, with hydraulically-operated motors or hand-operated motors being useful as well.

For certain designs of aerodynamic-shaped tethered balloons, it may be necessary or desirable to utilize a fin basket for the vertically disposed rear fin, with such a basket being illustrated at 63 in FIG. 7. In certain designs, support castor wheels 64 are preferably, but not necessarily provided for the basket 63, with the arrangement shown supporting rear fin 65 therewithin. Normally, however, in place of the tail fin basket, a simple boot may be utilized to cover the surface of the fin in order to prevent scuffing of the fin structure upon contacting the ground surface. For most applications, therefore, frictional resistance may be minimized by utilization of a fin covering boot.

While the length of the reach of a telescopic boom, when utilized, is dependent upon the requirements of the system, for most arrangements, a telescopically extended length of from 150% to approximately 200% of the retracted mast length is normally sufficient.

In normal use, the housing member 35 is free to move about the circular rail so that it maintains proper alignment with the flying sheave. This is, of course, correlated with the movement of the main tether line winch, with the main tether line winch pivoting so as to retain alignment with the flying sheave trolley, and also provides a means for assisting housing member 35 to function as a platform for servicing the balloon mounted payload.

When the balloon structure 11 is in fully moored disposition, it is desirable to provide a release means for the boom in order to permit free rotation of platform 35 about the circular rail, with this free rotation being with a minimum of frictional resistance. While in this disposition, a yaw mechanism is provided at the nose latch assembly in order to permit proper alignment of the structure between the nose latch assembly and the support platform 35. Yaw mechanisms of this type are known in the art and accordingly available.

With attention being directed to FIG. 6, it will be seen that the structure includes a pair of releasable pins 67 and 68 which, when removed, accomplish separation of boom 37 from platform 35. Thus, platform 35 is free to move about the circular rail with a minimum of frictional drag.

It will be appreciated that the immediate requirements of the system as dictated by the configuration of the balloon may change the lateral disposition of the close-haul trolleys relative to the flying sheave trolley, however their dispositions will, of course, be readily apparent to those skilled in the art.

We claim:

1. Mooring means for aerodynamically-shaped tethered balloons comprising:
   a. base mounting means including a frame means, mooring mast means secured to said frame means and comprising a turntable rotatable about the central axis thereof, a generally upright extensible and retractable rotatable mooring mast having a balloon coupling member adjacent the outward free end thereof for releasably securing a tethered balloon to said free end, and an endless circular rail disposed radially outwardly of said mooring mast, with said mooring mast being disposed at the center of said endless circular rail and having means for extension and retraction thereof;
   b. a radially extending generally horizontally disposed boom extending outwardly from said turntable and having boom coupling means at the free end thereof with wheel elements secured to the base of said boom coupling means and being disposed upon said endless circular rail;
   c. sheave means secured to said boom coupling means including a flying sheave with a tether line in operative relationship therewith and with the outer free end of said tether line being arranged to be operatively secured to a tethered balloon, and with the inner end thereof being captive with winch means and operative for controlled mooring of said tethered balloon, said flying sheave being operative generally intermediate said inner and outer ends, and a pair of laterally and outwardly disposed handling lines disposed laterally of said flying sheave, each of said handling lines having one end operatively coupled to said circular rail and with the opposed ends arranged to be coupled to opposed lateral side wall surfaces of a tethered balloon, with said handling lines being arranged to secure a tethered balloon to means supported upon said circular rail.

2. The mooring system as defined in claim 1 being particularly characterized in that winch means are provided for take-up of each of said handling lines.

3. The mooring system as defined in claim 1 being particularly characterized in that said rotatable mooring mast is formed of telescopically engaging segments.

4. The mooring system as defined in claim 1 being particularly characterized in that said boom is releasably secured to said boom coupling means, and wherein said winch means is secured to said mooring mast frame means.

* * * * *